United States Patent
Lehavi et al.

(10) Patent No.: US 10,242,125 B2
(45) Date of Patent: Mar. 26, 2019

(54) REGULAR EXPRESSION MATCHING

(71) Applicant: Hewlett Packard Enterprise Development LP, Houston, TX (US)

(72) Inventors: David Lehavi, Haifa (IL); Omer Barkol, Haifa (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 317 days.

(21) Appl. No.: 15/032,851

(22) PCT Filed: Dec. 5, 2013

(86) PCT No.: PCT/US2013/073249
§ 371 (c)(1),
(2) Date: Apr. 28, 2016

(87) PCT Pub. No.: WO2015/084360
PCT Pub. Date: Jun. 11, 2015

(65) Prior Publication Data
US 2016/0275205 A1 Sep. 22, 2016

(51) Int. Cl.
*G06F 17/30* (2006.01)
*G06F 17/27* (2006.01)

(52) U.S. Cl.
CPC .... *G06F 17/30985* (2013.01); *G06F 17/2775* (2013.01); *G06F 17/30* (2013.01)

(58) Field of Classification Search
CPC . G06F 17/30985; G06F 17/2775; G06F 17/30
(Continued)

(56) References Cited

U.S. PATENT DOCUMENTS 6,085,186 A 7/2000 Christianson et al.
7,185,081 B1 * 2/2007 Liao ............... H04L 47/2441
709/224
(Continued)

FOREIGN PATENT DOCUMENTS

EP 1986390 A3 * 10/2009 ......... H04L 63/0245
WO WO-03075170 A1 * 9/2003 ....... G06F 17/30896

OTHER PUBLICATIONS

Yang et al., "Optimizing Regular Expression Matching with SR-NFA on Multi-Core Systems", in Proceedings of the 2011 International Conference on Parallel Architectures and Compilation Techniques, pp. 424-433. (Year: 2011).*
(Continued)

*Primary Examiner* — Phuong Thao Cao

(57) ABSTRACT

Example embodiments relate to regular expression matching. An example method may include generating a data structure based on a non-deterministic finite automaton (NFA) that represents a regular expression. The data structure may include a set of segments where each segment indicates a segment starting state of the NFA. Each segment may represent zero or more consecutive states of the NFA starting at the segment starting state. Different segments of the set of segments may be capable of indicating different segment starting states on the NFA. Each segment may represent a partial match of the regular expression to the string. The method may further include analyzing the string in relation to the NFA. The method may further include modifying the data structure as the string is analyzed. Such modification may include attempting to expand at least one of the segments in the set to represent additional states of the NFA.

18 Claims, 8 Drawing Sheets

(58) Field of Classification Search
USPC .................................................... 707/759
See application file for complete search history.

(56) References Cited

U.S. PATENT DOCUMENTS

| | | | |
|---|---|---|---|
| 7,225,188 B1 | 5/2007 | Gai et al. | |
| 7,260,558 B1* | 8/2007 | Cheng | G06F 17/30985 706/12 |
| 7,689,530 B1* | 3/2010 | Williams, Jr. | G06F 17/30985 706/62 |
| 8,024,802 B1* | 9/2011 | Preston | H04L 63/1416 726/22 |
| 8,055,652 B1* | 11/2011 | Kumar | G06F 17/30938 707/716 |
| 8,392,174 B2 | 3/2013 | Cameron | |
| 8,448,249 B1* | 5/2013 | Preston | H04L 63/1416 709/223 |
| 8,464,232 B2 | 6/2013 | Urakhchin | |
| 8,494,985 B1 | 7/2013 | Keralapura et al. | |
| 8,495,101 B2 | 7/2013 | Koyanagi et al. | |
| 8,572,106 B1 | 10/2013 | Estan | |
| 8,700,593 B1* | 4/2014 | Estan | G06F 17/30985 707/706 |
| 9,270,641 B1* | 2/2016 | Preston | H04L 63/0245 |
| 9,336,194 B2* | 5/2016 | Manadhata | G06F 17/2775 |
| 9,665,664 B2* | 5/2017 | Ruehle | G06F 17/30985 |
| 2003/0051043 A1* | 3/2003 | Wyschogrod | G06F 17/30985 709/230 |
| 2003/0195874 A1* | 10/2003 | Akaboshi | G06F 17/30985 |
| 2006/0277534 A1* | 12/2006 | Kasuya | G06F 8/427 717/143 |
| 2008/0109431 A1* | 5/2008 | Kori | G06F 17/30985 |
| 2009/0049230 A1* | 2/2009 | Pandya | C11D 9/26 711/101 |
| 2010/0017397 A1* | 1/2010 | Koyanagi | G06F 17/30 707/E17.017 |
| 2010/0138367 A1* | 6/2010 | Yamagaki | G06F 17/30985 706/12 |
| 2010/0146623 A1* | 6/2010 | Namjoshi | G06F 21/552 726/23 |
| 2010/0161536 A1* | 6/2010 | Clark | G06F 21/552 706/46 |
| 2010/0192225 A1* | 7/2010 | Ma | G06F 17/30985 726/23 |
| 2010/0325157 A1* | 12/2010 | Yamagaki | G06F 17/30985 707/780 |
| 2011/0022617 A1 | 1/2011 | Yamagaki | |
| 2011/0093496 A1* | 4/2011 | Bando | G06F 17/30985 707/769 |
| 2011/0145181 A1* | 6/2011 | Pandya | G06F 17/30985 706/27 |
| 2012/0011094 A1* | 1/2012 | Yamagaki | G06F 7/02 706/45 |
| 2012/0221497 A1* | 8/2012 | Goyal | H04L 63/1416 706/12 |
| 2012/0331007 A1* | 12/2012 | Billa | H04L 69/22 707/797 |
| 2012/0331554 A1 | 12/2012 | Goyal et al. | |
| 2013/0133064 A1* | 5/2013 | Goyal | H04L 63/0254 726/22 |
| 2013/0191916 A1* | 7/2013 | Yao | H04L 63/1408 726/23 |
| 2013/0262493 A1* | 10/2013 | Atasu | G06F 17/30985 707/758 |
| 2013/0290356 A1* | 10/2013 | Yang | G06F 17/30985 707/755 |
| 2014/0101155 A1* | 4/2014 | Chao | H04L 41/16 707/737 |
| 2014/0101156 A1* | 4/2014 | Chao | H04L 63/1416 707/737 |
| 2014/0101157 A1* | 4/2014 | Chao | H04L 63/1416 707/737 |
| 2014/0101185 A1* | 4/2014 | Ruehle | G06F 17/30985 707/758 |
| 2014/0101187 A1* | 4/2014 | Chao | G06F 17/30985 707/758 |
| 2014/0115263 A1* | 4/2014 | Ruehle | G06F 17/272 711/137 |
| 2014/0149439 A1* | 5/2014 | Ruehle | G06F 17/30985 707/758 |
| 2014/0173603 A1* | 6/2014 | Ruehle | H04L 69/22 718/100 |
| 2014/0214749 A1* | 7/2014 | Ruehle | G06N 5/025 706/48 |
| 2015/0040142 A1* | 2/2015 | Cheetancheri | G06F 17/27 719/318 |
| 2015/0067836 A1* | 3/2015 | Billa | H04L 41/28 726/22 |
| 2015/0067863 A1* | 3/2015 | Billa | H04L 63/0245 726/24 |
| 2015/0074104 A1* | 3/2015 | Kim | G06F 17/30985 707/736 |
| 2018/0004483 A1* | 1/2018 | Goyal | G06F 21/567 |

OTHER PUBLICATIONS

T.T.Hieu et al., "ENREM: An Efficient NFA-Based Regular Expression Matching Engine on Reconfigurable Hardware for NIDS", Journal of Systems Architecture 59 (2013): pp. 202-212. (Year: 2013).*
Pao et al., "A Memory-Based NFA Regular Expression Match Engine for Signature-Based Intrusion Detection", Computer Communications 36 (2013): pp. 1255-1267. (Year: 2013).*
Beate Commentz-Walter, A string matching algorithm fast on the average, in: H. Maurer (Ed.), Proc. Sixth Internat. Coll. on Automata, Languages and Programming, Springer, Berlin, 1979, pp. 118-131.
Bruce W. Watson , Richard E. Watson A Boyer-Moore-style algorithm for regular expression pattern matching Science of Computer Programming 48 (2003) 99-117.
Cameron et al., "Fast Regular Expression Matching with Bit-parallel Data Streams", May 18, 2013, 5 pages.
Kearns, S., "Regular Expression Searching in Sublinear Time", Aug. 15, 2013, 35 pages.
Wikipedia, "Boyer-Moore string search algorithm", retrieved from the Internet on May 29, 2018, 8 pages. <http://en.wikipedia.org/wiki/Boyer-Moore_string_search_algorithm>.
Wikipedia, "Nondeterministic finite automation", retrieved from the Internet on May 29, 2018, 8 pages. <http://en.wikipedia.org/wiki/Nondeterministic_finite_automaton>.

* cited by examiner

Regex = .*a.*bca.*

NFA =

282 →

284 → fsdakjdsfaaaaadfl;kjhaabbcaadfkjg.
^D                    // extend left
^[)                   // extend left
 ^D                   // jump, extend left
 ^[)                  // jump, extend left
  ^D                  // extend left
  ^[)                 // jump, extend left
   ^D                 // extend left
   ^[)                // jump, extend left
    ^D                // jump, extend left
    ^[)               // jump, extend left
     ^D               // jump, extend left
     [)               // extend right (position arrow not shown)
     [>               // extend right (position arrow not shown)

REGULAR EXPRESSION MATCHING

BACKGROUND

A regular expression; or regex, is a mechanism used to describe a text pattern. Regular expressions may be used for text searching, for example, to check whether a given text string satisfies a pattern represented by the regular expression. Each character in a regular expression may be, for example, a regular character, with a literal meaning or a metacharacter, wildcard or the like, with a special meaning. Together, these can be used to identify textual material in the text string.

BRIEF DESCRIPTION OF THE DRAWINGS

The following detailed description references the drawings, wherein:

FIG. 2E shows a functional example of how a regex matching approach of the present disclosure may attempt to match a regex to a text string;

DETAILED DESCRIPTION

Figure 1:
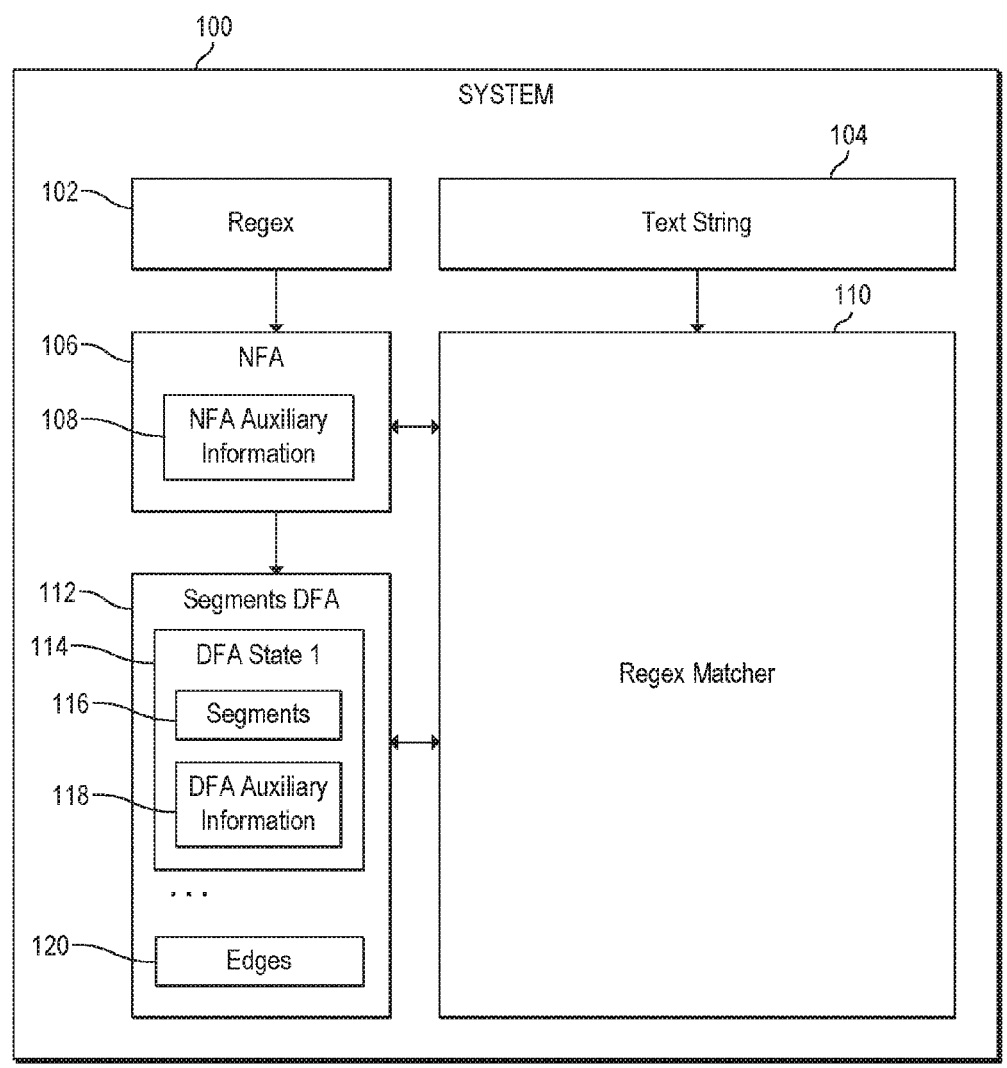
FIG. 1 is a block diagram of an example system that may use the regular expression matching approach of the present disclosure.

As mentioned above, a regular expression, or regex, may be used to check whether a given text string satisfies a pattern represented by the regular expression. To perform such a check, the text string may be analyzed with reference to the regular expression. Many regex matching algorithms analyze the text string one character at a time (e.g., from left to right).

To assist in determining whether a given text string satisfies a regular expression, the regular expression may be processed to form a state machine or automaton that represents the regular expression and allows an algorithm to interpret the regular expression in an orderly manner. The automaton may be a graph, for example, where the states of the graph correspond to partial or complete matches to the regular expression. Any regex may be processed to form what is called a non-deterministic finite automaton (NFA). NFA's occupy a small space—only as much space as the regular expression itself. Additionally, NFA's are efficient to compute, e.g., O(m) computing time.

NFA's may be efficient to compute, but they are slow to use to match a regular expression to a text string, for example, because a sub-match between the regex and the string may appear in multiple states of the NFA. In a NFA, a single state may proceed to multiple other states of the NFA, even with the same input. Thus, some matching algorithms may follow all possible sub-matches. Other algorithms may follow a particular sub-match until that branch of the NFA cannot be matched any further. Then, these algorithms may backtrack and pursue the next sub-match. These algorithms (all possible sub-matches, backtracking) are slow to use. For example, the backtracking approach may be exponentially slow in the size of the text string.

Instead of directly using a NFA to match a regex to a text string, some algorithms first create a deterministic finite automaton (DFA), e.g., based on the NFA. The DFA may be similar to the NFA, except in a DFA, a single state proceeds deterministically to a different state given a particular input. Any state on such a DFA corresponds to exactly one sub-match; thus, DFAs are fast to run. However, a large amount of up-front processing may be required to create the DFA. DFA's may be very large. For example, their size may be exponential in the size of the NFA.

Instead of using a NFA only or a DFA, some algorithms may use a hybrid NFA/DFA approach. Such approaches tend to start by processing the NFA, and then may compute DFA type data structures (e.g., representing a portion of the NFA) during the matching routine. In some algorithms, DFA parts may be constructed and/or discarded on the fly (during the matching routine), e.g., depending on the input (i.e., characters of the text string). Some hybrid regex matching algorithms are very inefficient, for example, with regard to the information they compute and/or store at each state of the NFA. For example, some algorithms save a whole DFA suffix tree at each node of the NFA. This makes such algorithms prohibitively expensive both from a memory standpoint and a performance standpoint. In real-world use, the amount of memory (e.g., in an L2 cache) that a data structure occupies to perform regex matching is a real concern. In theory, some algorithms may work from a functional standpoint. A goal of this disclosure is to describe an approach that is efficient in real-world use. One example real-world use for which an approach such as the one described herein may be used is hardware accelerators. For hardware accelerators, the efficiency of the regex matching approach is very important.

The present disclosure describes regular expression matching, for example, between a text string and a regex. In particular, the present disclosure describes an approach that allows multiple characters of a text string to be skipped during the regex matching routine in various circumstances. This character skipping vastly accelerates the matching routine compared to algorithms that analyze a text string one character at a time. The amount of acceleration may be equivalent to the average number of characters that are skipped. The approach of the present disclosure is also faster and more efficient than algorithms that directly use a NFA and algorithms that use a full DFA. The approach of the present disclosure may be considered to be a hybrid NFA/DFA approach; however, this approach is more efficient than other hybrid NFA/DFA algorithms (e.g., those that compute far too much DFA information at each state of the NFA).

In the present disclosure, a data structure referred to as a "segments DFA" may be generated based on a non-deterministic finite automaton (NFA) that represents a regular expression. The data structure may include a set of segments where each segment may indicate a segment starting state of the NFA. Furthermore, each segment may represent zero or more consecutive states of the NFA starting at the segment starting state. Each segment may represent a partial match of the regular expression to the string. Then, while the string is analyzed in relation to the NFA, the data structure may be modified. Such modification may include attempting to expand at least one of the segments in the set to represent additional states of the NFA. Thus, instead of starting the analysis of the NFA from the beginning and advancing to the end (like various other regex matching approaches), an approach of the present disclosure may start at multiple nodes of the NFA (even all nodes in some circumstances) and attempts to extend segments that match the string.

FIG. 1 is a block diagram of an example system 100 that may use the regular expression matching approach of the present disclosure. System 100 may be any computing device that is capable of receiving a regular expression (e.g., regex 102) and a text string (e.g., 104) and then implementing the regular expression matching approach described herein. For example, system 100 may include electronic circuitry (i.e., hardware) that implements the regular expression matching approach described herein. Alternatively or in addition, system 100 may include a machine-readable storage medium that includes instructions that, when executed, implements the regular expression matching approach described herein. Accordingly, system 100 may include a processor to execute such instructions. System 100 may also include at least one repository or data store that may store digital information such as text, symbols, computer code, settings or other type of information. Each of these repositories may include or be in communication with at least one physical storage mechanism that is capable of storing digital information in a volatile (e.g., RAM) or non-volatile manner (e.g., hard drive, solid state drive, etc.). In the example of FIG. 1, system 100 includes a regex 102, a text string 104, a NFA 106, a regex matcher 110 and a segments DFA 112.

Regex 102 may be stored (e.g., temporarily) on system 100, for example, in a repository of system 100 as described above. Regex 102 may have been received by system 100, for example, in response to input from a user or other system. Alternatively, regex 102 may have been generated by system 100, e.g., in response to some signal or stimulus. Text string 104 may be stored (e.g., temporarily) on system 100, for example, in a repository of system 100 as described above. Text string 104 may have been received by system 100, for example, in response to input from a user or other system. Alternatively, text string 100 may have been generated by system 100, e.g., in response to some signal or stimulus. In some examples, test string 100 may be part of a larger set of information (e.g., a text document or the like), which may be stored on system 100 or external to system 100.

NFA 106 may be stored (e.g., temporarily) on system 100, for example, in a repository of system 100 as described above. NFA 106 may be updated at various times. NFA 106 may result from processing (e.g., by regex matcher 110 or some other component of system 100) regex 102. As described above, any regex may be processed to form a non-deterministic finite automaton (NFA). In some examples, NFA 106 may have been received by system 100 in a post-processed format, e.g., from another system that processed regex 102. In such examples, regex 102 may be stored on that other system and may not be stored on system 100. NFA 106 may include NFA auxiliary information 108, which may be generated by regex matcher 110, e.g., after analyzing NFA 106. In some examples, NFA auxiliary information 108 may be stored alongside NFA 106 instead of being stored as part of NFA 106.

NFA auxiliary information 108 may be determined (e.g., by regex matcher 110) up front or prior to the regex matching routine. NFA auxiliary information 108 may be determined by processing (e.g., by regex matcher 110) NFA 106. NFA auxiliary information 108 may include information that is stored for each state of NFA 106, and this information may be used by regex matcher 110 during the regex matching routine, e.g., to progress through the NFA during the regex matching routine and to determine jumps efficiently.

Figure 2A:
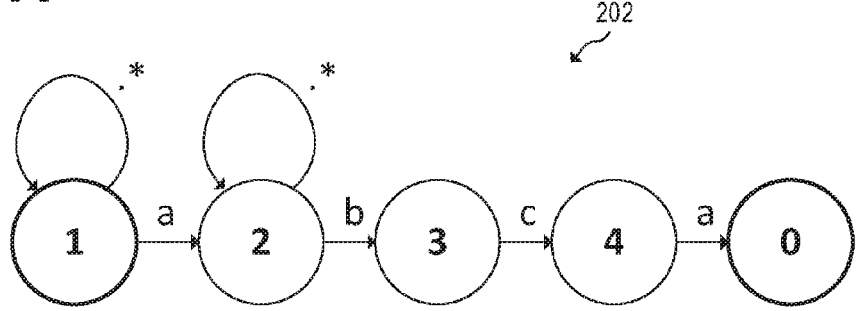
FIG. 2A shows an example regex and an example NFA based on the regex, where the regex and the NFA may be used to describe various examples of the regex matching approach of the present disclosure.

In some examples, NFA auxiliary information 108 includes, for each NFA state, information (e.g., a table) regarding the closest .* states of the NFA. As mentioned above, regular expressions may include metacharacters, wildcards and the like, which have special meanings. One such metacharacter/wildcard combination is .*, as can be seen in the example of FIG. 2A (regex .*a.*bca.*). The special meaning of this combination is that it can match any characters and any number of characters. In real-word situations, .* is very commonly used, perhaps the most commonly used metacharacter/wildcard. Thus, various examples of the present disclosure may use regexes with .* as examples. Furthermore, in some examples, the regex matching approach described herein may be optimized for regexes with .*. This means that in real-world situations, the approach described herein may run very fast in a large number of real-world scenarios. More information about what is meant by a .* state may be described in more detail below, e.g., with respect to FIG. 2A.

Returning to NFA auxiliary information 108, maintaining, for each NFA state, information regarding the closest .* states of the NFA may allow for determining (during regex matching) how long of a jump can be made on the string. As will become clear from the descriptions and examples below, a "jump" may refer to a situation during the regex matching routine where multiple characters of the text string may be skipped. A goal of the present approach is to jump as far as possible on the text string without hitting a .* state. Determining the closest .* states upfront prevents these determinations from having to be computed on the fly during regex matching. NFA auxiliary information 108 may also include, for each NFA state, information about which other NFA states are reachable (i.e., via a series of consecutive NFA states, otherwise known as a path) from the current state. This closest .* state information and path information can be determined based on the NFA 106 without having to start (i.e., prior to) the regex matching routine. This information may be computed and stored (per state) up front with the idea that it may be used if the regex matching routing is currently at the particular NFA state and no potential matches exists (e.g., between the text string and at least one segment of the segment DFA 112), as will be described in more detail with the examples that follow below. NFA auxiliary information 108 may also include, for each node, information about the minimal length of the NFA portion used for matching. This may allow for efficient jumping, as the amount of jump may be equivalent to this minimal length (e.g., minus some character if, for example, the currently analyzed character of the text string matches a character in the middle of the portion of the NFA used for matching). NFA auxiliary information 108 may include various other pieces of auxiliary information, and the examples of auxiliary information described herein should not be construed as limiting.

Segments DFA 112 may be stored (e.g., temporarily) on system 100, for example, in a repository of system 100 as described above. Segments DFA 112 may be updated at various times, for example, during the regex matching routine. More particularly, segments DFA 112 may be updated as various characters of the text string (e.g., 104) are analyzed. Segments DFA 112 may be initially generated (e.g., by regex matcher 110) based on NFA 106, and then may be updated (e.g., by adding states and/or updating the DFA auxiliary information of a state) as regex matcher 110 progresses through the regex matching routine.

Segments DFA 112 may be a data structure of sorts that maintains information about NFA 106. The term "segments DFA" includes the acronym DFA because this data structure serves a similar purpose to a full DFA in that it allows for deterministic progression through a NFA. However, segments DFA 112 maintains a minimal amount of information in a compact manner such that a large amount of memory is not required to perform the regex matching routine, unlike routines that use a full DFA or other hybrid NFA/DFA approaches. Segments DFA 112 may include a number of DFA states (e.g., DFA state 114, etc.) and edges 120.

Segments DFA 112 may include a number of DFA states, for example, DFA state 114. For example, initially, segments DFA 112 may include a single state (e.g., state 114), and then regex matcher 110 may create more states during the regex matching routine. In this respect, an entire DFA is not generated up front. In fact, minimal DFA information is generated until such information is needed during the regex matching routine. Previously created DFA states may be saved after they are created in case they are needed again during the regex matching routine, which may save computational effort.

Figure 2B:
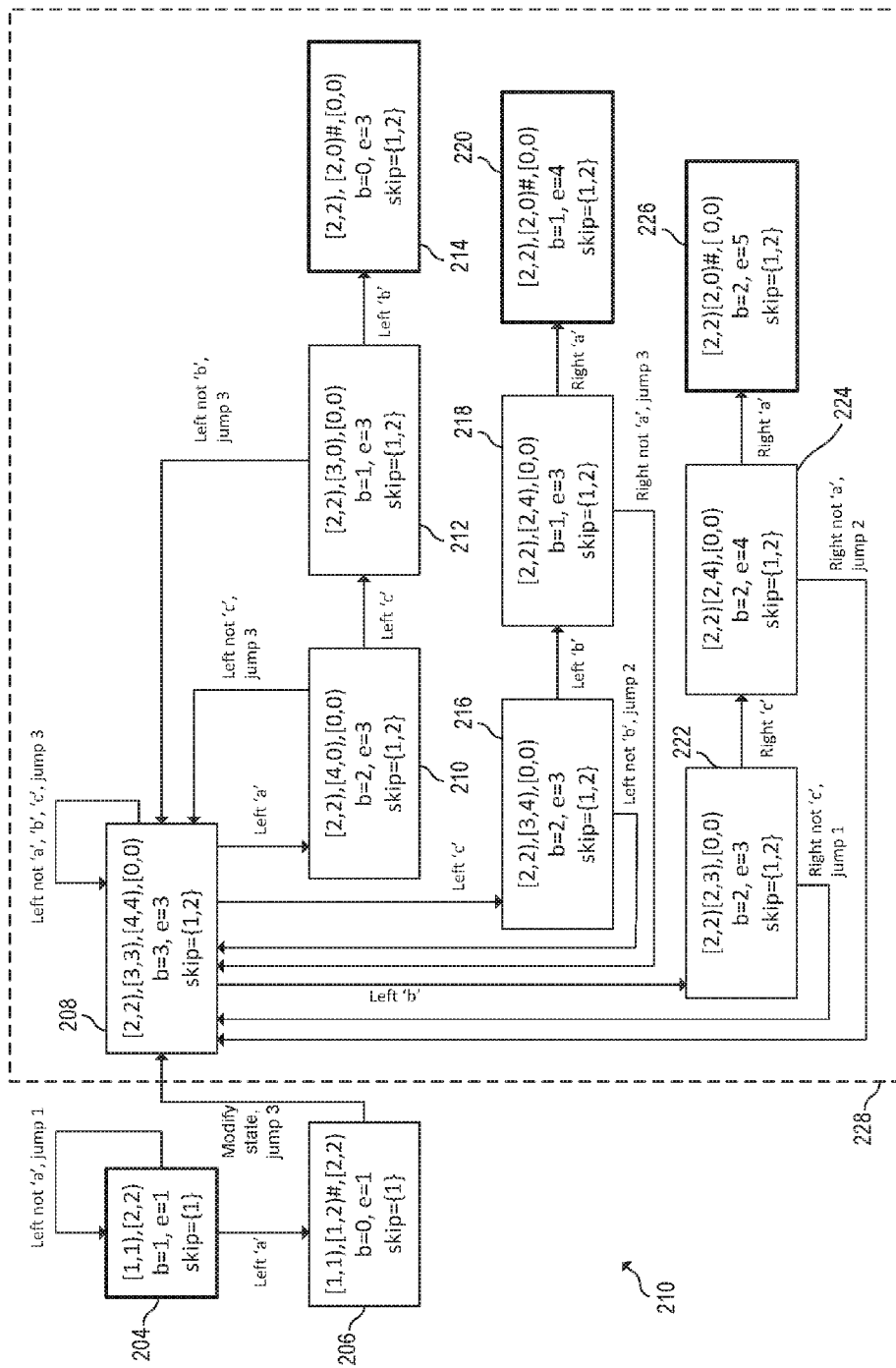
FIG. 2B shows an example segments DFA data structure.

Each DFA state (e.g., 114) may include a set of segments (e.g., 116) and DFA auxiliary information (e.g., 118). A "segment" may indicate one or two states on NFA 106 and may represent all consecutive states (i.e., a path) on the NFA between any two indicated states. It may be said that a segment includes a "pair" of states on the NFA 106; however, in some situations, both states of the pair may be the same state. In these situations, the length of the segment is zero. Thus, each segment may represent zero or more consecutive states of the NFA starting at a segment starting state of the NFA. The segment starting state may be represented by the first state (e.g., X) listed in a pair of states (e.g., using the "[X,Y]" notation) for a segment. Each segment may indicate its own segment starting state on the NFA, which may be the same or different as segment starting states indicated by other segments. A set of segments associated with a particular DFA state then represents a current "location" on the NFA or matching portions of the NFA. In other words, each segment represents a partial match of the regular expression (e.g., 102) to the string 104; and a set of segments for a particular state represents all the partial matches up to the current point in the regex matching routine. Several example segments will be shown and described in the examples provided below. Various example segments are shown in FIG. 2B, with the "[X,Y]" notation for each segment.

Each DFA state (e.g., 114) may include DFA auxiliary information (e.g., 118). DFA auxiliary information 118 may be determined (e.g., by regex matcher 110) based on the current state of the regex matching routine and the current location on the NFA. DFA auxiliary information 118 may be used by regex matcher 110 during the regex matching routine, for example, to efficiently process jumps (e.g., when to jump and/or how far). DFA auxiliary information 118 may be updated (e.g., by regex matcher 110) at various times during the regex matching routine, for example, when different characters of the text string are analyzed. Additionally, when regex matcher 110 determines that a new state should be created for the segments DFA 112, a new set of DFA auxiliary information 118 may be generated. This new set of DFA auxiliary information 118 may be based on the DFA auxiliary information of the previous state, and the DFA auxiliary information of the previous state may be stored in case it is needed later during the regex matching routine.

For a particular state (e.g., state 114), DFA auxiliary information 118 may include the current character of the text string that is being analyzed, which may also be referred to as the current "location" on the text string. DFA auxiliary information 118 may also include the identity of any reoccurring wildcard (e.g., * or .*) states that have been passed on the NFA up to the current point in the regex matching routine. An example of this type of auxiliary information is shown in FIG. 2B, for example, with the "skip={ }" notation. As may be described in more detail below, this information may be used to determine when a jump can be performed on the text string, DFA auxiliary information 118 may also include at least one offset on the string, e.g., from the end of a portion of the string that was previously matched during the regex matching routine. An example of this type of auxiliary information is shown in FIG. 2B, for example, with the 'b' (beginning) and 'e' (end) notation. DFA auxiliary information 118 may include various other pieces of auxiliary information, and the examples of auxiliary information described herein should not be construed as limiting.

Edges 120 may be components of the segments DFA 112 data structure that allow for progression from one state of segments DFA 112 to another state. As described above, initially, segments DFA 112 may include only a single state (e.g., state 114). Thus, initially, segments DFA 112 may not include any edges. Then, when regex matcher 110 creates more states during the regex matching routine, regex matcher 110 may also create edges that link the states. Previously created edges may be saved after they are created in case they are needed again during the regex matching routine, which may save computational effort. Example edges are shown in FIG. 2B as arrows between the various states (shown as boxes) of the segments DFA.

Edges 120 may include or allow for the creation of various types of edges. In some examples, three types of edges are allowed. A first type of edge ("left" or "left extension") may indicate that at least one of the segments of the current state of the segments DFA may be extended (i.e., because it matches) to the left on the text string from the current position/character of the text string. A second type of edge ("right" or "right extension") may indicate that at least one of the segments of the current state of the segments DFA may be extended to the right on the text string from the current position/character of the text string. A third type of edge ("jump") may indicate that the current position on the text string will be moved right from the right most character analyzed thus far. The amount of jump may be one or more characters. The amount of jump may be determined based on auxiliary information (e.g., NFA auxiliary information 108 and/or DFA auxiliary information of the current state of segments DFA 112). For example, as may be described in more detail below, NFA auxiliary information 108 may include the minimal length of the NFA (or NFA portion) based on the current position on the NFA. Thus, if the regex matching routine is at that particular NFA position when there are no matches, the jump amount may be the that minimal length.

Jumps may be performed in various situations during the regex matching routine. In one example situation where a jump may occur, all of the segments of the current segments DFA state reach a point where they cannot be extended (i.e., matched) further (right or left) and yet the segments have not been extended to terminal points in the regex/NFA (e.g., beginning, end, .* etc.). This situation may generally be referred to as "not matching" or "no match." In another example situation where a jump may occur, the left sides of all the segments are "matched" or "glued" to a terminal point. Such a terminal point may be the start of the regex/NFA, one state to the right of a previously matched portion of the NFA or a .* (or other reoccurring wildcard) state. Various other details regarding jumps will become clear with reference to the various examples described below.

Regex matcher 110 may handle various aspects of the regex matching routine. The term "regex matching routine" may generally refer to the routine of determining whether a regular expression (e.g., 102, perhaps represented by NFA 106) matches a text string (e.g., 104). Regex matcher 110 may handle various aspects of preparation before the regex matching routine as well, for example, generating NFA 106 based on regex 102, and generating an initial segments DFA 112 based on NFA 106. Regex matcher 110 may include electronic circuitry (i.e., hardware) that implements the functionality of regex matcher 110 as described herein. Alternatively or in addition, regex matcher 110 may include instructions (e.g., stored on a machine-readable storage medium of system 100) that, when executed (e.g., by a processor of system 100), implement the functionality of regex matcher 110 as described herein. Regex matcher 110 may communicate with at least one repository or data store of system 100 (described above), that may store digital information representing at least one of regex 102, text string 104, NFA 106 and segments DFA 112. Regex matcher 110 may read such digital information and/or may modify such digital information (e.g., during the regex matching routine).

FIGS. 2A to 2E are used below to describe various examples of the regex matching approach of the present disclosure. Referring to FIG. 2A, an example regex 200 (e.g., similar to regex 102 of FIG. 1) is shown that will be used for the various examples of FIGS. 2A to 2E. FIG. 2A also shows an example NFA 202 (e.g., similar to NFA 106 of FIG. 1) based on regex 200. The terms "node" and "state" may be generally used interchangeably throughout this disclosure when referring to NFA's. As can be seen from FIG. 2A, NFA 202, includes approximately the same number of states as there are characters and metacharacters/wildcards in regex 200. More specifically, regular characters 'a' (first), 'b', 'c', 'a' (second) are represented by edges that each lead to a state of NFA 200 (states 2, 3, 4, 0). NFA 202 also includes an initial state (state 1). Finally, NFA 202 represents the .* metacharacters/wildcards of regex 200 by .* edges. More specifically, the first .* metacharacter/wildcard of regex 200 is represented by the .* edge on node 1 of NFA 200, and the second .* metacharacter/wildcard is represented by the .* edge on node 2. The third .* metacharacter/wildcard of regex 200 does not need to be represented in NFA 202. NFA nodes/states that have a .* edge may be referred to as .* nodes or .* states.

FIG. 2A may also be used to describe the meaning of "left" and "right" as is commonly used to describe movement or progression through an NFA. NFA's may be said to have a starting state/node or root state/node, which is state 1 in NFA 202. Then, a right movement on the NFA may refer to a movement on the NFA that gets further away (e.g., in the number of nodes) from the root node. For example, movement from node 2 to node 3. Likewise, a left movement on the NFA may refer to a movement on the NFA that gets closer to the root node. For example, movement form node 3 to node 2. It should be understood that the terms "left" and "right" as used herein to describe expansion of segments or movement on the NFA should not be construed to limit the description herein to any particular orientation of the NFA. Instead, these are shorthand terms used to make the descriptions herein easier to follow.

FIG. 2B shows an example segments DFA data structure (e.g., similar to segments DFA 112). The boxes shown in FIG. 2B represent states of the segments DFA, and the arrows represent edges between states. As described above, the states of the segments DFA are not all pre-generated up front. Instead, they are generated as the regex matching routine progresses. Thus, initially, only a first state (204) may exist. As can be seen from the first state 204, the state includes two segments [1,1) and [2,2). With reference to NFA 202, this set of segments indicates that nodes 1 and 2 will be used to start the regex matching routine. In other words, these nodes may be referred to as "initializers" (or initializer nodes, or initializer states). As will become clear by comparing the various examples provided in FIGS. 2A to 2E, in some approaches of the present disclosure, all nodes of the NFA may be used as initializers from the very beginning of the regex matching routine. In other words, all nodes of the NFA may be represented as segments of length zero and then all segments may be extended (attempted matching) at each position of the text string. Alternatively, a subset of all the NFA nodes may be used as initializers, for example, subsets of nodes separated by reoccurring wildcards (e.g., .*). This is the example of FIG. 2B. Thus the initializers in this example are node 1 and 2, because the first 'a' is separated from "bca" by a .* wildcard.

With regard to segments [1,1) and [2,2) of state 204, the '[' notation refers to a NFA state that is "included" in the segment and the ')' notation refers to a NFA state that is not included (although the range of the segment extends up to that state). When both states indicated by a segment are the same (e.g., [1,1)), the "[X,X)" notation indicates that the 'X' node is not included, but that the segment will attempt to match/extend starting at that node.

Referring again to FIG. 2B, and initial state 204 includes some DFA auxiliary information. For example, state 204 includes a 'b' (beginning) value and an 'e' (end) value. These 'b' and 'e' values are each an offset on the string from the end of a portion of the string that was previously matched during the regex matching routine. When a jump is performed, these 'b' and 'e' values are initialized to be the same and are initialized to be equal to the minimal length of the matching portion of the NFA. With regard to the first stage 204 of segments DFA 210, 'b' and 'e' are each initialized to 1 because in this example, a first portion (the first 'a') of the regex 200 is attempted to be matched first, and this first portion has a minimum length of 1. Then, it can be seen later on in the segments DFA 210, after the 'a' character is matched, and a jump is made to state 208, 'b' and 'e' are each initialized to 3, because the next portion ("bca") of regex 200 is being matched, which has a length of 3. Then, as segments are extended the 'b' and 'e' values for that state may be updated. For example, if a "left extension" edge is taken to the next state, the 'b' value may be reduced by 1, and if "right extension" edge is taken, the 'e' value may be increased by 1. In this respect, it may always be known which portion of the string is matched since the last matching portion of the string.

Referring again to initial stage 204, this state includes additional DFA auxiliary information indicated by "skip={ }" notation. This information indicates identity of any reoccurring wildcard (e.g., * or .*) states that have been passed on the NFA up to the current point in the regex matching routine. As mentioned above, node 1 of NFA 202 is a .* node, and because the initial segment first .* node is satisfied immediately in the regex matching routine, node 204 shows that the .* node (node 1) has been passed, by the "skip={1}" notation. Keeping track of this information allows for tracking of when the left side of some segment in the set is fully matched (e.g., at a .* node), which means that a jump may be performed as soon as the right side is fully matched. In the example of FIG. 2B, the "[ )#" (notice the #) notation is used to indicate when a segment is "glued" to the most recent wildcard node passed. For example, in states 206, notice that segment [1,2) means that node 1 is included in the segment, which matches the 1 in shown inside the "skip" brackets. Similarly, in states 214; 220 and 226, segments [2,0) are glued to node 2.

What follows is a brief explanation of how the segments DFA 210 of FIG. 2B may flow through its various states based on various inputs (e.g., characters of the text string). Starting at state 204, the first 'a' of regex 200 may be used to perform matching on a text string (along with the preceding .*). Thus, the current segments are [1,1) and [2,2). Because segments start at a length of 0, a first "left extension" essentially means that the current character of the segment is checked. In this example, the .* segment is sure to match, so the state transition from state 204 depends only on whether the current location on the text string matches 'a'. Thus, if the left extension on character 'a' (otherwise called "left 'a'") matches the text string, the segments DFA 210 may move to state 206. If left 'a' does not match the text string, a jump of 1 is made on the text string, and the segments DFA stays at state 204. Once at state 206, it may be seen that a segment ([1,2)) is glued to the most recently passed .* node (1) and that the right side of the segment is fully matched. Thus a jump may occur, and the amount of the jump (3) may be the minimum length of the next portion of the NFA to use for matching ("bca", and the preceding .* and trailing .*). We then arrive at state 208.

At state 208, a new set of segments are initiated for each of the nodes in the portion of the NFA being used for matching. The "skip" bracket is also updated because the .* node 2 was passed. At this position on the text string, it may be checked whether the current text character is any of the characters from the current sent of segments (characters 'b', 'c', 'a'). If none of the characters match, the current position on the text string may be jumped by 3. If any of the characters match, it may be determined whether left or right extensions are required. As one example, if the current character matches 'c' (e.g., a left 'c' extension), then the segments DFA 210 may move to state 216, and the segments may be updated. Then, because 'c' falls in the middle of "bca", a left b extension may be attempted. If that results in a match, the segments DFA 210 may move to state 218. Then, again, because falls in the middle of "bca", a right a extension may be attempted. If that results in a match, the segments DFA 210 may move to state 220, and a complete match between the text string and the regex may be complete. If the left b or right a extensions fail, the segments DFA may return to state 208 via a jump edge, where the jump value depends on which extension fails. Similar sub routines may be performed for a left a edge from state 208 to state 210 and for a left b edge from state 208 to state 222.

Figure 2C:
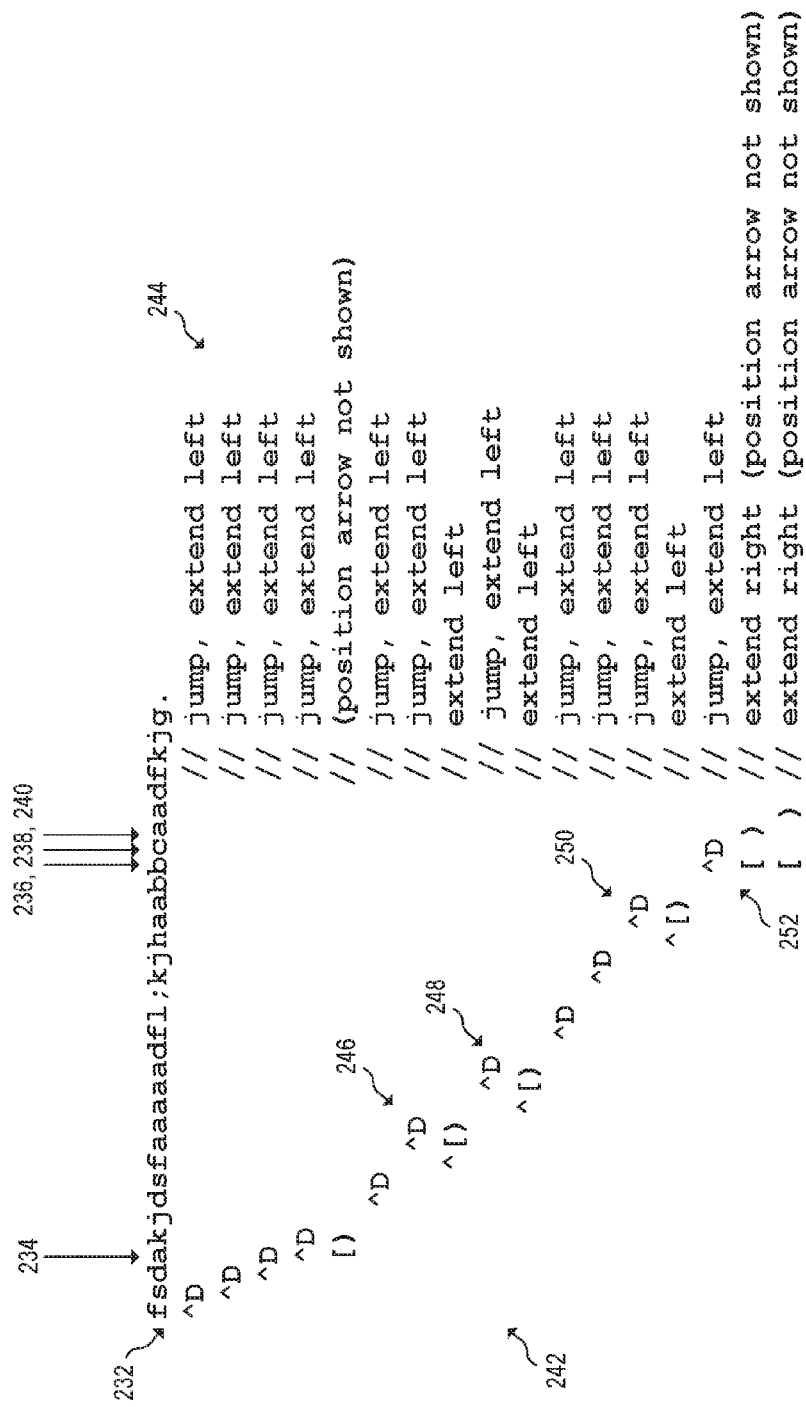
FIG. 2C shows a functional example of how a regex matching approach of the present disclosure may attempt to match a regex to a text string.

FIG. 2C shows a functional example of how a regex matching approach of the present disclosure may attempt to match regex 200 (.*a.*bca.*) to an example text string (text string 232). The example of FIG. 2C may use the segments DFA of FIG. 2B. In FIG. 2C, it can be seen that arrows 234, 236, 238 and 240 indicate the positions/characters in text string 232 where regex 200 will ultimately match. Accordingly, the character indicated by arrow 234 will match the first 'a' in regex 200 and arrows 236, 238, 240 will match the "bca" portion of regex 200. It should be understood that the example shown in FIG. 2C follows the approach of FIG. 2B where the regex is split into portions (e.g., portions divided by .*), and thus, for regex 200, the approach will first attempt to match the first 'a', and then attempt to match the "bca" portion.

Continuing with the example of FIG. 2C, the starting character of text string 232 may be the minimum length of the current regex portion ('a') being used to match to the text string. Thus, the current position skips only 1 character to start at the first 'f' in text string 232. Then, the progression of the regex matching routine through text string 232 is shown via notations generally indicated by reference number 242 in FIG. 2C. With respect to these notations, the "^" character indicates the current character of the text string 232 that is being analyzed or considered. It may also be said that a "pointer" is maintained at the currently analyzed character of the string. Additionally, the '[' and ')' notations are very similar to the 'b' (beginning) and 'e' (end) notations described above—they are offsets from the previously matched or considered portion of text string 232. When a jump occurs, the '[' and ')' notations are located on the same character, is represented by the 'D' notation. Then, as a left or right expansions are performed, the '[' and ')' notations separate from each other to show matched portions of text string 232.

Thus, the regex matching routine of the example of FIG. 2C starts at the first 'f' of text string 232, and when a match fails (the character is not 'a'), a jump of 1 is performed (the length of the regex portion 'a'). An attempted match on the first character after a jump is actually a "left extension" operation (or edge of segments DFA 210), as can be seen from comments 244. This is because the matched portion of text string 232 is initially zero after a jump. As can be seen by FIG. 2C, several of these failed matches and jumps are performed until the current character of text string 232 becomes the first 'a' (indicated by arrow 234). At this point, the first portion ('a') of regex 200 is matched. Then, the next portion ("bca") of regex 200 is used to match; thus, jumps of 3 (length of "bca") are now used after a completely failed match on a character of the text string (i.e., not 'b', 'c' or 'a'). As can be seen by FIG. 2C, after the match at character 234, two jumps of 3 are performed until an 'a' is detected in the text string (shown generally by reference number 246). Because 'a' in the text string matches one of the characters of the current regex portion ("bca"), a second left extension is attempted to see if the character to the left of this 'a' character in the text string is a 'c'. Because it is not, a jump is performed. A similar check is performed after the jump (shown generally by reference number 248), and a similar failed left extension occurs. A similar check is performed after 3 more jumps (shown generally by reference number 250), and a similar failed left extension occurs.

Finally, after one more jump, a 'b' character (236) is detected in the text string (shown generally by reference number 252). Because the 'b' in the text string matches the 'b' in the current regex portion ("bca"), a right extension is attempted to see if the next character (238) to the right in the text string is a 'c'. It is, so another right extension is attempted to see if the next character (240) to the right in the text string is an 'a'. It is, and then the entire regex 200 is matched in text string 232.

Figure 2D:
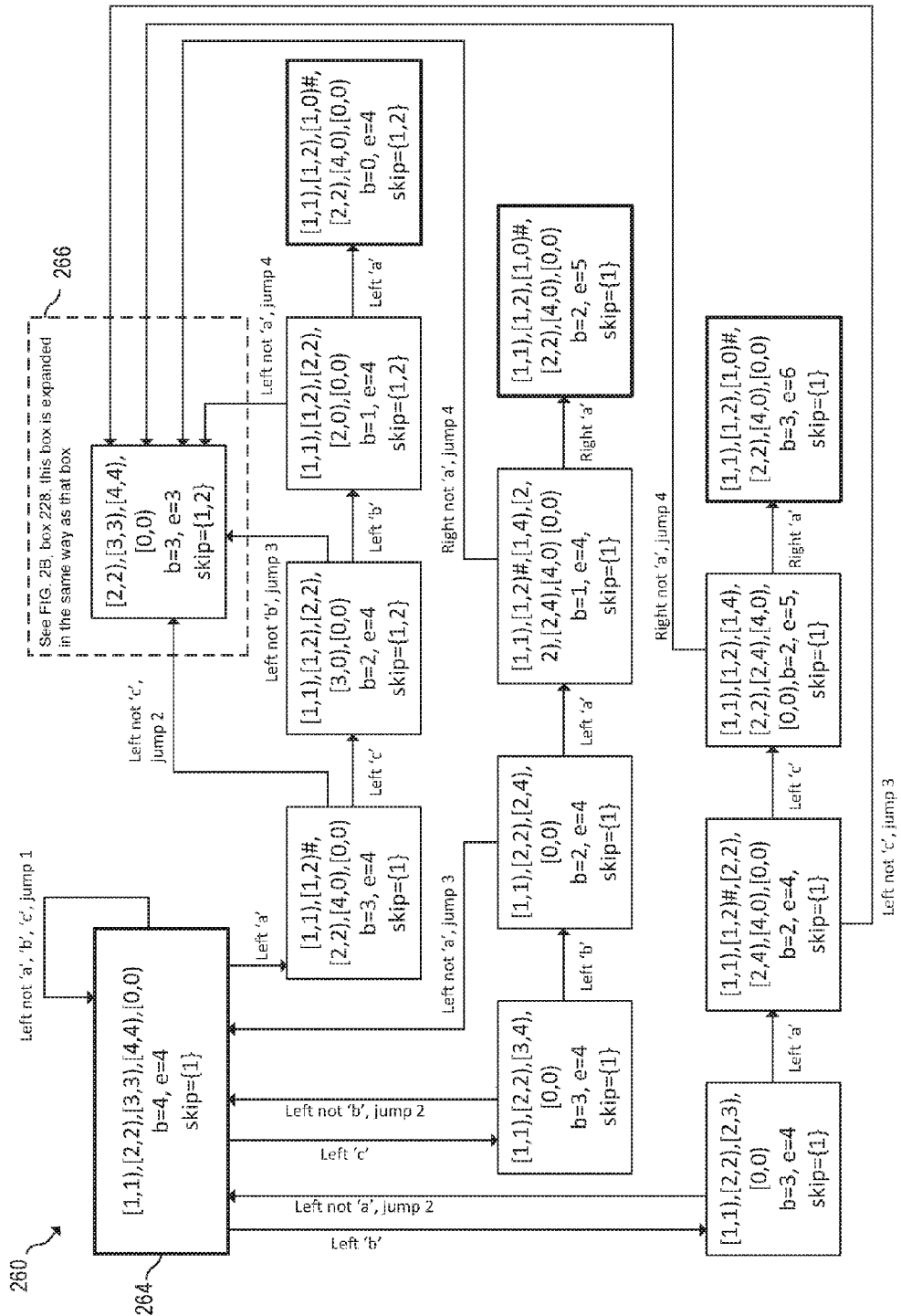
FIG. 2D shows an example segments DFA data structure.

FIG. 2D shows another example segments DFA data structure 260 (e.g., similar to segments DFA 112). As described above, in some examples of the present disclosure, a subset of all the NFA nodes may be used as initializers, for example, subsets of nodes separated by reoccurring wildcards (e.g., .*). This is the example of FIG. 2B. FIG. 2D shows an alternate approach where all nodes of the NFA are used as initializers from the very beginning of the regex matching routine. In other words, at the first state (264) of segments DFA 260, all nodes of NFA 202 may be represented as segments of length zero and then all segments may be extended (attempted matching) as each character of the text string is analyzed. Thus the initializers in this example, at state 264, are node 1, 2, 3, 4 and 0. Then from node 264, all segments are extended (attempted matching). In this example, because the regex is .*a.*bca.*, a check (i.e., left extension) is made for characters 'a', 'b' and 'c'. The rest of the progression through segments DFA 260 is similar to that described in FIG. 2B. Once the segments DFA 260 progresses to the state in box 266, the progression through segments DFA 260 is identical to the progression shown in box 228 of FIG. 2B.

FIG. 2E shows a functional example of how a regex matching approach of the present disclosure may attempt to match regex 200 (.*a.*bca.*) to an example text string (text string 282). The example of FIG. 2E may use the segments DFA of FIG. 2D. In FIG. 2E, it can be seen that arrows 284, 286, 288 and 290 indicate the positions/characters in text string 282 where regex 200 will ultimately match. The example of FIG. 2E may proceed in a similar manner to the example of FIG. 2C; however, it should be understood that the example shown in FIG. 2E follows the approach of FIG. 2D where all nodes of the NFA are used as NFA initializers from the start. In other words, the entire regex is compared to text string 282 initially, and thus the first character of text string 282 that is analyzed is character 284, because the minimum length of the regex portion used to analyze the text string is 4 ("abca"). Because an 'a' is detected at character 284, the first 'a' in the regex is matched. Thus, from that point on, only "bca" is used for matching and thus the minimum length is 3. Thus, several jumps of 3 may be seen in FIG. 2E before character 286 is reached.

By comparing the example of FIGS. 2B, 2C with the example of FIGS. 2D, 2E, it should be realized that various forms of the segments DFA may be implemented. However, the basic structure (e.g., a set of segments and the various pieces of auxiliary information maintained at each state) of the segments DFA remains similar between the various implementations. Using one implementation versus the other may be a policy choice. In some examples, the decision of whether to use the implementation of FIGS. 2B, 2C or the implementation of FIGS. 2D, 2E or some other similar implementation may be made automatically, for example, by regex matcher 110. Regex matcher 110 may, for example, analyze the structure of the regular expression (e.g., how many regular characters, how many and what type of metacharacters, wildcards, etc.) to determine which implementation is optimal.

Figure 3:
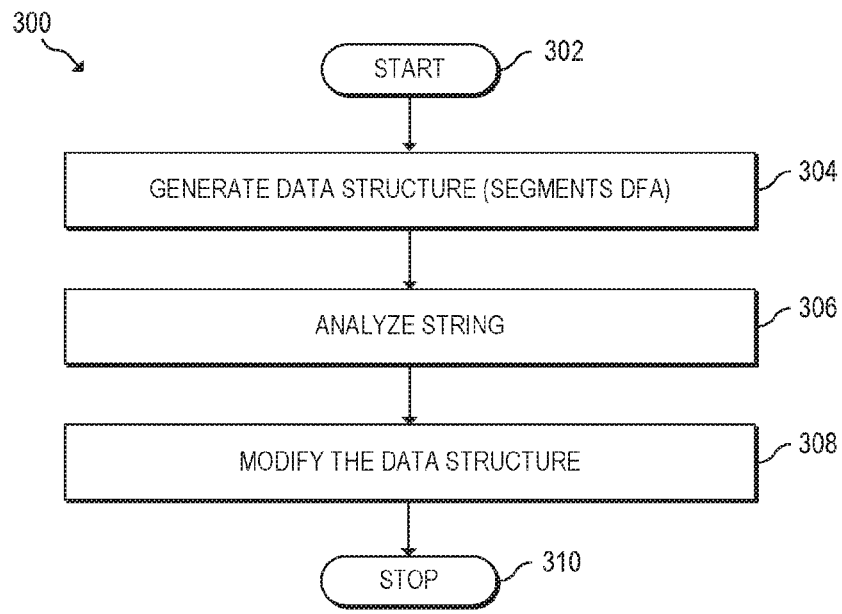
FIG. 3 is a flowchart of an example method for regular expression matching.

FIG. 3 is a flowchart of an example method 300 for regular expression matching. Method 300 may be described below as being executed or performed by a computing device, for example, computing device 400 of FIG. 4. Other suitable computing devices or systems may be used as well, for example, system 100 shown in FIG. 1. Method 300 may be implemented in the form of executable instructions stored on at least one machine-readable storage medium of the computing device (e.g., 420 of FIG. 4), and/or in the form of electronic circuitry. In alternate embodiments of the present disclosure, one or more steps of method 300 may be executed substantially concurrently or in a different order than shown in FIG. 3. In alternate embodiments of the present disclosure, method 300 may include more or less steps than are shown in FIG. 3. In some embodiments, one or more of the steps of method 300 may, at certain times, be ongoing and/or may repeat.

Method 300 may start at step 302 and continue to step 304, where a computing device (e.g., 400 of FIG. 4) may generate (e.g., via instructions 422 of FIG. 4) a data structure based on a non-deterministic finite automaton (NFA) that represents a regular expression. The data structure may include a set of segments where each segment may indicate a segment starting state of the NFA. Each segment may also represent zero or more consecutive states of the NFA starting at the segment starting state. Different segments of the set of segments are capable of indicating different segment starting states on the NFA. Each segment may represent a partial match of the regular expression to the string. At step 306, the computing device may analyze (e.g., via instructions 424) the string in relation to the NFA. At step 308, the computing device may modify (e.g., via instructions 426) the data structure as the string is analyzed. Such modification may include attempting to expand at least one of the segments in the set to represent additional states of the NFA. Method 300 may eventually continue to step 310, where method 300 may stop.

Figure 4:
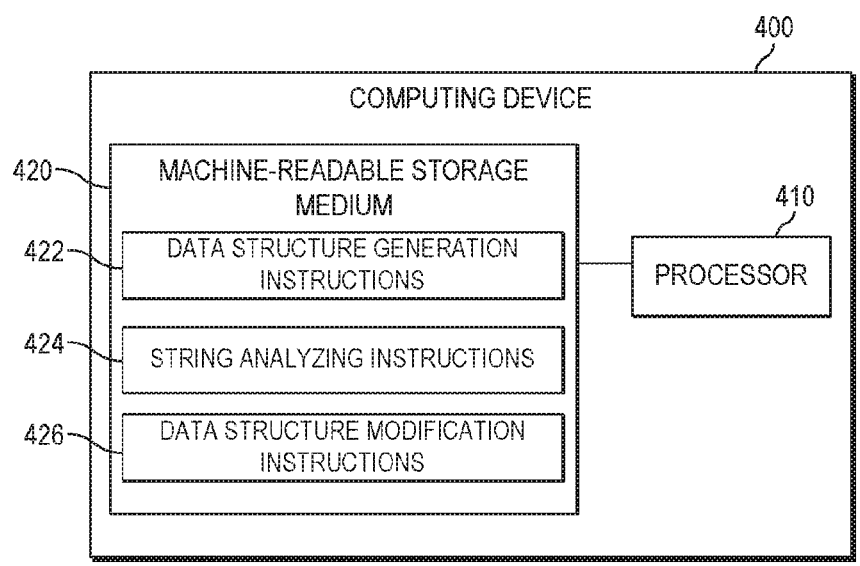
FIG. 4 is a block diagram of an example computing device for regular expression matching.

FIG. 4 is a block diagram of an example computing device 400 for regular expression matching. Computing device 400 may be similar to system 100 of FIG. 1, for example. Computing device 400 may be any computing device that is capable of receiving a regular expression and a text string and then implementing a regular expression matching approach described herein. In the embodiment of FIG. 4, computing device 400 includes a processor 410 and a machine-readable storage medium 420. Alternatively or in addition, computing device 400 may include electronic circuitry (i.e., hardware) that implements similar functionality.

Processor 410 may be one or more central processing units (CPUs), microprocessors, and/or other hardware devices suitable for retrieval and execution of instructions stored in machine-readable storage medium 420. In the particular embodiment shown in FIG. 4, processor 410 may fetch, decode, and execute instructions 422, 424, 426 to facilitate regular expression matching. As an alternative or in addition to retrieving and executing instructions, processor 410 may include one or more electronic circuits comprising a number of electronic components for performing the functionality of one or more instructions in machine-readable storage medium 420. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 420 may be any electronic, magnetic, optical, or other physical storage device that stores executable instructions. Thus, machine-readable storage medium 420 may be, for example, Random Access Memory (RAM), an Electrically-Erasable Programmable Read-Only Memory (EEPROM), a storage drive, an optical disc, and the like. Machine-readable storage medium 420 may be disposed within computing device 400, as shown in FIG. 4. In this situation, the executable instructions may be "installed" on the computing device 400. Alternatively, machine-readable storage medium 420 may be a portable, external or remote storage medium, for example, that allows computing device 400 to download the instructions from the portable/external/remote storage medium. In this situation, the executable instructions may be part of an "installation package". As described herein, machine-readable storage medium 420 may be encoded with executable instructions for regular expression matching.

Referring to FIG. 4, data structure generation instructions 422, when executed by a processor (e.g., 410), may generate a data structure based on a non-deterministic finite automaton (NFA) that represents a regular expression. The data structure may initially include a first state that includes a set of segments where each segment indicates a segment starting state of the NFA. Each segment may represent zero or more consecutive states of the NFA starting at the segment starting state. Different segments of the set of segments may be capable of indicating different segment starting states on the NFA. Each segment may represent a partial match of the regular expression to the string. String analyzing instructions 424 may analyze the string in relation to the NFA. A pointer may be maintained to a currently analyzed character of the string. Data structure modification instructions 426 may modify the data structure as the string is analyzed. Such modification may include adding states to the data structure as characters of the string are matched to states of the NFA.

Figure 5:
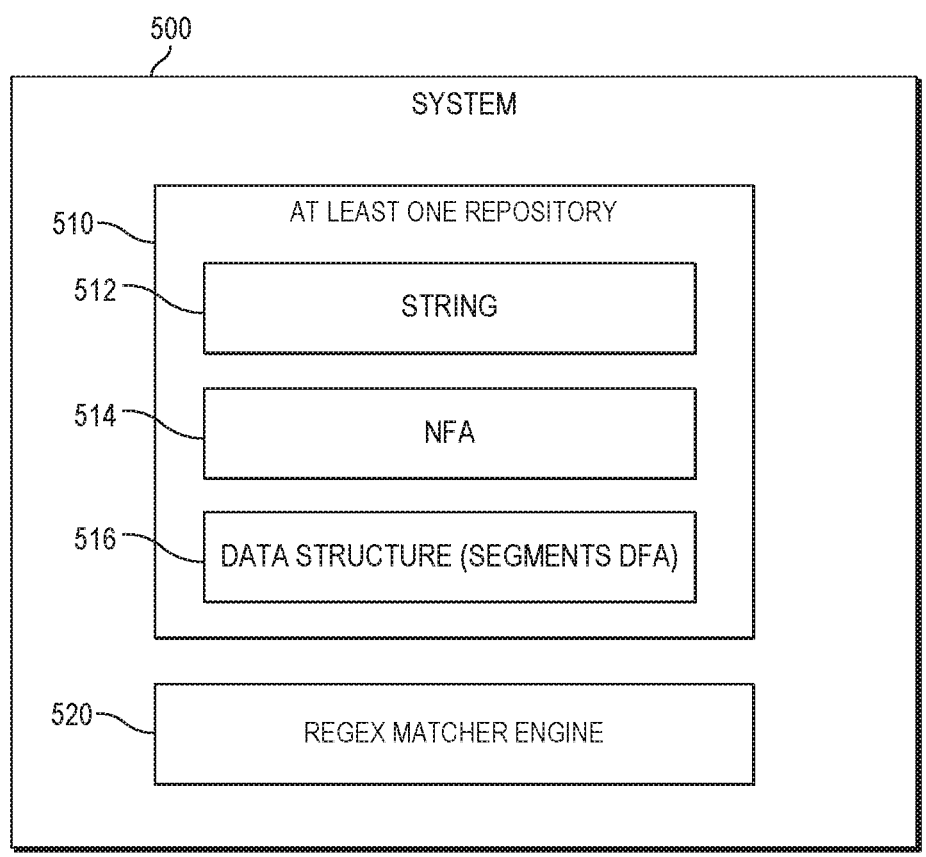
FIG. 5 is a block diagram of an example system for regular expression matching.

FIG. 5 is a block diagram of an example system 500 for regular expression matching. System 500 may include any number of computing devices. System 500 may be any system that is capable of receiving a regular expression and a text string and then implementing a regular expression matching approach described herein. In the embodiment of FIG. 5, system 500 includes at least one repository 510. Each repository may include or be in communication with at least one physical storage mechanism that is capable of storing digital information in a volatile (e.g., RAM) or non-volatile manner (e.g., hard drive, solid state drive, etc.). System 500 may include a regex matcher engine 520. Regex matcher engine 520 may be similar to regex matcher 110 of FIG. 1, for example. Regex matcher engine 520 includes one or more hardware devices including electronic circuitry for implementing the functionality of regex matcher engine 520. Regex matcher engine 520 may also include a series of instructions executable by the one or more hardware devices of regex matcher engine 520.

The at least one repository 510 may store a string 512, a non-deterministic finite automaton (NFA) 514 that represents a regular expression, and a data structure 516 (e.g., a segments DFA) based on the NFA. The data structure may include a set of segments where each segment may indicate a segment starting state of the NFA. Each segment may represent zero or more consecutive states of the NFA starting at the segment starting state. Different segments of the set of segments may be capable of indicating different segment starting states on the NFA. Each segment may represent a partial match of the regular expression to the string. Regex matcher engine 520 may match the regular expression to the string 512. The regex matcher engine 520 may analyze the string 512 in relation to the NFA 514 and modify the data structure 516 as the string is analyzed. Such modification may include attempting to expand at least one of the segments in the set to represent additional states of the NFA.

The invention claimed is:

1. A method for matching a regular expression to a string, the method comprising:
   generating, by a processor of a computing device, a data structure based on a non-deterministic finite automaton (NFA) that represents the regular expression, wherein the data structure includes a set of segments, each segment indicating a segment starting state of the NFA, and each segment representing zero or more consecutive states of the NFA starting at the segment starting state, and wherein different segments of the set of segments are capable of indicating different segment starting states on the NFA, and wherein each segment represents a partial match of the regular expression to the string;
   analyzing, by the processor, the string in relation to the NFA; and
   modifying, by the processor, the data structure as the string is analyzed, such modification including attempting to expand at least one of the segments in the set to represent additional states of the NFA.

2. The method of claim 1, wherein analyzing the string includes:
   maintaining a pointer to a currently analyzed character of the string, wherein the currently analyzed character is compared to states of the NFA; and
   jumping the pointer to later characters of the string when none of the segments of the set can be extended further, wherein the jumping includes moving the pointer over multiple characters of the string that have not yet been analyzed.

3. The method of claim 1, wherein attempting to expand at least one of the segments includes attempting to expand a first segment to the left and to the right.

4. The method of claim 1, wherein attempting to expand at least one of the segments includes attempting to expand a first segment to the left when a currently analyzed character of the text string matches a state represented by the first segment.

5. The method of claim 4, wherein attempting to expand at least one of the segments includes attempting to expand the first segment to the right when a currently analyzed character of the text string matches a state represented by the first segment and the first segment cannot be extended any further to the left.

6. The method of claim 1, wherein the modification includes attempting to expand multiple segments in the set such that each segment represents additional states of the NFA.

7. The method of claim 1, wherein the set of segments only includes one segment for each state of the NFA, and wherein the modification includes attempting to expand all segments in the set such that each segment represents additional states of the NFA.

8. The method of claim 1, wherein the set of segments initially only includes one segment for each state of a subset of the states of the NFA, wherein the subset of states of the NFA is separated from the rest of the states of the NFA by a state that represents a wildcard, and wherein the modification includes attempting to expand all segments in the set such that each segment represents additional states of the NFA.

9. A non-transitory machine-readable storage medium storing instructions for matching a regular expression to a string, the instructions executable by a processor of a computing device to cause the processor to:
   generate a data structure based on a non-deterministic finite automaton (NFA) that represents the regular expression, wherein the data structure initially includes a first state that includes a set of segments, each segment indicating a segment starting state of the NFA, and each segment representing zero or more consecutive states of the NFA starting at the segment starting state, and wherein different segments of the set of segments are capable of indicating different segment starting states on the NFA, and wherein each segment represents a partial match of the regular expression to the string;

analyze the string in relation to the NFA, wherein a pointer is maintained to a currently analyzed character of the string; and modify the data structure as the string is analyzed, such modification including adding states to the data structure as characters of the string are matched to states of the NFA.

10. The non-transitory machine-readable storage medium of claim 9, wherein the added states include a second state that includes a set of segments that are the same as the segments of the first state except that at least one of the segments is expanded to represent additional states of the NFA.

11. The non-transitory machine-readable storage medium of claim 9, wherein the added states include a third state that includes a set of segments that are the same as the segments of the first state except that multiple of the segments are expanded to represent additional states of the NFA.

12. The non-transitory machine-readable storage medium of claim 9, wherein the instructions are further to cause the processor to modify the data structure to add edges to the added states from existing states of the data structure, wherein each edge represents a type of movement of the pointer on the string.

13. The non-transitory machine-readable storage medium of claim 12, wherein each edge is related to how the set of segments of the particular added state change compared to the source state from which the edge came.

14. The non-transitory machine-readable storage medium of claim 13, wherein each edge represents one of the following: extend left, extend right, jump at least one character to the right.

15. A system, comprising:
at least one repository to store a string, a non-deterministic finite automaton (NFA) that represents a regular expression, and a data structure based on the NFA, wherein the data structure includes a set of segments, each segment indicating a segment starting state of the NFA, and each segment representing zero or more consecutive states of the NFA starting at the segment starting state, and wherein different segments of the set of segments are capable of indicating different segment starting states on the NFA, and wherein each segment represents a partial match of the regular expression to the string;

a processor; and a memory storing instructions that when executed cause the processor to match the regular expression to the string, wherein to match the regular expression to the string, the instructions are to cause the processor to analyze the string in relation to the NFA and modify the data structure as the string is analyzed, such modification including attempting to expand at least one of the segments in the set to represent additional states of the NFA.

16. The system of claim 15, wherein the instructions are to cause the processor to analyze the string, including causing the processor to:

maintain a pointer to a currently analyzed character of the string, wherein the currently analyzed character is compared to states of the NFA; and jump the pointer to later characters of the string when none of the segments of the set can be extended further, wherein the jumping includes moving the pointer over multiple characters of the string that have not yet been analyzed.

17. The system of claim 15, wherein to attempt to expand at least one of the segments, the instructions are to cause the processor to attempt to expand a first segment to the left when a currently analyzed character of the text string matches a state represented by the first segment.

18. The system of claim 15, wherein to attempt to expand at least one of the segments, the instructions are to cause the processor to attempt to expand the first segment to the right when a currently analyzed character of the text string matches a state represented by the first segment and the first segment cannot be extended to the left.

* * * * *